United States Patent
You et al.

(10) Patent No.: US 11,827,524 B2
(45) Date of Patent: Nov. 28, 2023

(54) METHOD FOR PREPARING CATHODE ACTIVE MATERIAL PRECURSOR FOR SECONDARY BATTERY, AND PREPARATION APPARATUS USING SAME

(71) Applicants: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

(72) Inventors: Ki Sung You, Pohang-si (KR); Hwang Yol Ryu, Pohang-si (KR)

(73) Assignees: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

( * ) Notice: Subject to any disclaimer, the term of this patent is extended or adjusted under 35 U.S.C. 154(b) by 829 days.

(21) Appl. No.: 16/772,913

(22) PCT Filed: Jun. 19, 2018

(86) PCT No.: PCT/KR2018/006921
§ 371 (c)(1),
(2) Date: Aug. 14, 2020

(87) PCT Pub. No.: WO2019/117411
PCT Pub. Date: Jun. 20, 2019

(65) Prior Publication Data
US 2021/0163306 A1 Jun. 3, 2021

(30) Foreign Application Priority Data
Dec. 15, 2017 (KR) .................. 10-2017-0173202

(51) Int. Cl.
*C01D 5/08* (2006.01)
*B01J 19/24* (2006.01)
(Continued)

(52) U.S. Cl.
CPC ............... *C01D 5/08* (2013.01); *B01J 19/24* (2013.01); *C01C 1/185* (2013.01); *C01C 1/24* (2013.01);
(Continued)

(58) Field of Classification Search
CPC ..... C01D 5/08; C01D 5/04; C01D 5/18; B01J 19/24; B01J 2219/00029;
(Continued)

(56) References Cited

U.S. PATENT DOCUMENTS 8,211,397 B2 7/2012 Sun et al.

FOREIGN PATENT DOCUMENTS

CN 1886847 A 12/2006
CN 101809788 A 8/2010
(Continued)

OTHER PUBLICATIONS

Chinese Office Action dated Mar. 22, 2022 issued in Chinese Patent Application No. 201880088757.7.
(Continued)

*Primary Examiner* — Steven J Bos
*Assistant Examiner* — Syed T Iqbal
(74) *Attorney, Agent, or Firm* — Morgan, Lewis & Bockius LLP (57) ABSTRACT

A method for preparing a cathode active material precursor for a secondary battery, including: moving a co-precipitation filtrate generated after a co-precipitation reaction to a co-precipitation filtrate storage tank; removing a metal hydroxide by passing the co-precipitation filtrate through a filter; reacting the co-precipitation filtrate from which the metal
(Continued)

hydroxide is removed with sulfuric acid or nitric acid to produce an ammonium sulfate or an ammonium nitrate while removing ammonia from the co-precipitation filtrate from which the metal hydroxide is removed; cooling and crystallizing the co-precipitation filtrate from which the metal hydroxide and ammonia are removed to precipitate a sodium sulfate; filtering the precipitated sodium sulfate to separate the precipitated sodium sulfate from the co-precipitation filtrate from which the metal hydroxide and ammonia are removed; drying the sodium sulfate separated from the co-precipitation filtrate and moving the co-precipitation filtrate separated from the sodium sulfate to a circulation concentration tank; and heating the co-precipitation filtrate stored in the circulation concentration tank to a predetermined temperature for recycling and performing $N_2$ purging or bubbling, is provided.

14 Claims, 11 Drawing Sheets

(51) Int. Cl.
| | | |
|---|---|---|
| *C01C 1/18* | (2006.01) | |
| *C01C 1/24* | (2006.01) | |
| *H01M 4/04* | (2006.01) | |
| *H01M 4/58* | (2010.01) | |
| *H01M 10/054* | (2010.01) | |
| *H01M 4/02* | (2006.01) | |

(52) U.S. Cl.
CPC .......... *H01M 4/0497* (2013.01); *H01M 4/58* (2013.01); *H01M 10/054* (2013.01); *B01J 2219/00029* (2013.01); *B01J 2219/00033* (2013.01); *H01M 2004/028* (2013.01)

(58) Field of Classification Search
CPC .... B01J 2219/00033; B01J 2219/00423; B01J 2219/00754; C01C 1/185; C01C 1/24; C01C 1/18; H01M 4/0497; H01M 4/58; H01M 10/054; H01M 2004/028; C01P 2002/72; C01P 2004/03; Y02E 60/10; Y02P 20/582; Y02W 10/40
See application file for complete search history.

(56) References Cited

FOREIGN PATENT DOCUMENTS

| | | | |
|---|---|---|---|
| CN | 102336494 A | 2/2012 | |
| CN | 103296268 A | 9/2013 | |
| CN | 103797623 A | 5/2014 | |
| CN | 104953111 A | 9/2015 | |
| CN | 106367621 A | 2/2017 | |
| CN | 106430332 A | 2/2017 | |
| CN | 106517656 A | 3/2017 | |
| CN | 106573794 A | 4/2017 | |
| CN | 106803588 A | 6/2017 | |
| CN | 106848474 A | 6/2017 | |
| CN | 106957124 A | 7/2017 | |
| CN | 107112515 A | 8/2017 | |
| CN | 107408667 A | 11/2017 | |
| JP | 2004-210560 A | 7/2004 | |
| JP | 2004-521060 A | 7/2004 | |
| JP | 2013-202475 A | 10/2013 | |
| KR | 10-2005-0083869 A | 8/2005 | |
| KR | 10-2006-0035547 A | 4/2006 | |
| KR | 10-0759751 B1 | 10/2007 | |
| KR | 10-0887186 B1 | 3/2009 | |
| KR | 10-2010-0112843 A | 10/2010 | |
| KR | 10-2011-0024733 A | 3/2011 | |
| KR | 10-2011-0061043 A | 6/2011 | |
| KR | 10-2012-0063424 A | 6/2012 | |
| KR | 10-2012-0079801 A | 7/2012 | |
| KR | 10-1305056 B1 | 9/2013 | |
| KR | 10-1440241 B1 | 9/2014 | |
| KR | 10-2015-0139100 A | 12/2015 | |
| KR | 10-2016-0013674 A | 2/2016 | |
| KR | 10-2016-0078031 A | 7/2016 | |
| KR | 10-2017-0033787 A | 3/2017 | |
| KR | 10-2018-0074250 A | 7/2018 | |
| KR | 10-2018-0130241 A | 12/2018 | |
| WO | WO-2011068327 A2 * | 6/2011 | ............... C02F 9/00 |
| WO | 2015-111761 A1 | 7/2015 | |
| WO | 2016-129732 A1 | 8/2016 | |

OTHER PUBLICATIONS

Japanese Office Action dated Aug. 17, 2021 issued in Japanese Patent Application No. 2020-532992.

Extended European Search Report dated Jan. 25, 2021 issued in European Patent Application No. 18887326.9.

* cited by examiner

| Element | Weight% | Atomic% |
|---|---|---|
| O | 48.63 | 60.35 |
| Na | 32.04 | 27.67 |
| S | 19.33 | 11.97 |
| Totals | 100.00 | |

$$2NH_3 + H_2SO_4 \leftrightarrow (NH_4)_2SO_4$$

METHOD FOR PREPARING CATHODE ACTIVE MATERIAL PRECURSOR FOR SECONDARY BATTERY, AND PREPARATION APPARATUS USING SAME

TECHNICAL FIELD

Background Art

(a) Field of the Invention

The present invention relates to a method for preparing a cathode active material precursor for a secondary battery and a preparing apparatus using the same, and more particularly, to a method for preparing a cathode active material precursor for a secondary battery and a preparing apparatus implementing the preparing method that may include a co-precipitation filtrate recycling process.

(b) Description of the Related Art

Depending on rapid development of science and technology, electric vehicles requiring mass storage devices as well as various electronic products and communication devices have been recently eluted, and a demand for secondary batteries, which are their power source, is rapidly increasing.

Generally, the most advanced technology for preparing a cathode active material precursor for a secondary battery is a technology preparing it by using a co-precipitation method, and for a co-precipitation reaction, a high concentration metal solution in which $NiSO_4$, $CoSO_4$, and $MnSO_4$ are mixed in an appropriate ratio is injected into a reactor together with NaOH and $NH_4OH$ to generate nuclei and react for a long time to obtain a precursor having a constant particle diameter.

The co-precipitation method utilizes a continuous stirred tank reactor (CSTR), a Kuet Taylor reactor, and a batch reactor, and a shape, a particle size, and morphology of the precursor are changed according to pH, temperature, and a stirring condition. Generally, when a large amount of precursor needs to be prepared, the continuous stirred tank reactor is used, and when precursor quality is required, the batch reactor is used.

Generally, ammonia is added as a chelating agent to overcome a difference in co-precipitation rate according to pH of metal ions such as nickel, cobalt, and manganese in the reaction by the co-precipitation method, and in this case, depending on the pH conditions, the metal ions (particularly nickel) are eluted by coordinate bonding with ammonia, and remain in the solution at a certain amount. In this case, a supernatant turns blue as an amount of the eluted nickel increases. Even after filtered through a filter press after the co-precipitation, the eluted nickel is dissolved in the remaining co-precipitation filtrate to require separate wastewater treatment, which is a factor that causes an increase in a raw material cost in preparing precursors.

Generally, after the co-precipitation reaction, the precursor, which is a product, is filtered through the filter press, water-washed 2-3 times, and then dried. In this case, in a case of preparing 1 ton of precursor when the required washing liquid is included, waste water is generated at about 50 tons, and ammonia, eluted metal ions, and sodium sulfate are included in the waste water, thus a separate wastewater treating facility is required and costs are required. Most of the ammonia, eluted metal ions, and sodium sulfate remain in the remaining solution after filtration in the co-precipitation filtrate, and trace amounts of ammonia and sodium sulfate are included in the washing liquid generated in the washing. In the wastewater such as the co-precipitation filtrate and washing liquid, the ammonia is removed through a wet scrubber using sulfuric acid, the metal ions are precipitated and settled through a catalyst in a heavy metal treating tank, and the rest is treated as waste water.

In the prior art or documents, a continuous stirring tank reactor, a Kuet Taylor reactor, a batch reactor, and the like are known, but no co-precipitation process has been proposed that may improve a yield of metal ions eluted during the co-precipitation process, reduce an amount of wastewater generated, or recycle a co-precipitation filtrate.

DISCLOSURE

Technical problems to be solved by the present invention are to provide, in preparing a cathode active material precursor for a secondary battery, a method of recycling metal ions contained in a co-precipitation filtrate generated during a reaction, improving a yield during a co-precipitation reaction, and dramatically reducing an amount of wastewater generated.

An embodiment of the present invention provides a method for preparing a cathode active material precursor for a secondary battery, including: moving a co-precipitation filtrate generated after a co-precipitation reaction to a co-precipitation filtrate storage tank; removing a metal hydroxide by passing the co-precipitation filtrate through a filter; reacting the co-precipitation filtrate from which the metal hydroxide is removed with sulfuric acid or nitric acid to produce an ammonium sulfate or an ammonium nitrate while removing ammonia from the co-precipitation filtrate from which the metal hydroxide is removed; cooling and crystallizing the co-precipitation filtrate from which the metal hydroxide and ammonia are removed to precipitate a sodium sulfate; filtering the precipitated sodium sulfate to separate the precipitated sodium sulfate from the co-precipitation filtrate from which the metal hydroxide and ammonia are removed; drying the sodium sulfate separated from the co-precipitation filtrate and moving the co-precipitation filtrate separated from the sodium sulfate to a circulation concentration tank; and heating the co-precipitation filtrate stored in the circulation concentration tank to a predetermined temperature for recycling and performing $N_2$ purging or bubbling.

The method for preparing the cathode active material precursor for the secondary battery may further include increasing pH of the co-precipitation filtrate to 11.8 or more by adding NaOH to the co-precipitation filtrate in the co-precipitation filtrate storage tank.

In the method for preparing the cathode active material precursor for the secondary battery, in the removing of the metal hydroxide by passing the co-precipitation filtrate through the filter, the metal hydroxide may include a metal hydroxide remaining in the co-precipitation filtrate and a metal hydroxide newly formed when NaOH is added to the co-precipitation filtrate.

In the method for preparing the cathode active material precursor for the secondary battery, in the reacting of the co-precipitation filtrate from which the metal hydroxide is removed with the sulfuric acid or nitric acid to produce the ammonium sulfate or ammonium nitrate while removing ammonia from the co-precipitation filtrate from which the metal hydroxide is removed, the ammonia may be $NH_3$ in a gaseous state.

In the method for preparing the cathode active material precursor for the secondary battery, in the cooling and crystallizing the co-precipitation filtrate from which the metal hydroxide and ammonia are removed to precipitate the sodium sulfate, the co-precipitation filtrate may be cooled to 10° C.

In the method for preparing the cathode active material precursor for the secondary battery, in the heating of the co-precipitation filtrate stored in the circulation concentration tank to the predetermined temperature for recycling, the temperature may be 45° C. or higher.

In the method for preparing the cathode active material precursor for the secondary battery, in the co-precipitation reaction, a metal solution may be prepared by dissolving a metal sulfate in distilled water, and the metal solution may be injected into a reactor together with NaOH and $NH_4OH$; and instead of $NH_4OH$ in the co-precipitation reaction, the ammonium sulfate produced while removing the ammonia may be re-dissolved and used.

Another embodiment of the present invention provides a preparing apparatus of a cathode active material precursor for a secondary battery, including: a co-precipitation filtrate storage tank configured to store a co-precipitation filtrate generated after a co-precipitation reaction; a filter configured to remove a metal hydroxide from the co-precipitation filtrate; an ammonia removal membrane contactor configured to remove ammonia from the co-precipitation filtrate from which the metal hydroxide is removed; a sulfuric acid or nitric acid tank configured to supply sulfuric acid or nitric acid to be in contact with ammonia to the ammonia removal membrane contactor; a cooling and crystallizing tank configured to cool and crystallize the co-precipitation filtrate from which the metal hydroxide and ammonia are removed to precipitate sodium sulfate; a filter configured to filter the precipitated sodium sulfate to separate the precipitated sodium sulfate from the co-precipitation filtrate from which the metal hydroxide and ammonia are removed; a dryer configured to dry the sodium sulfate separated from the co-precipitation filtrate; a circulation concentration tank configured to store the co-precipitation filtrate separated from the sodium sulfate; and an initial solution preparation tank configured to heat the co-precipitation filtrate stored in the circulation concentration tank to a predetermined temperature for recycling and to perform $N_2$ purging or bubbling.

In the preparing apparatus of the cathode active material precursor for the secondary battery, pH of the co-precipitation filtrate may be increased to 11.8 or more by adding NaOH to the co-precipitation filtrate in the co-precipitation filtrate storage tank.

In the preparing apparatus of the cathode active material precursor for the secondary battery, the filter may remove a metal hydroxide remaining in the co-precipitation filtrate and a metal hydroxide newly formed when NaOH is added to the co-precipitation filtrate.

In the preparing apparatus of the cathode active material precursor for the secondary battery, ammonia may exist as $NH_3$ in a gaseous state in the ammonia removal membrane contactor.

In the preparing apparatus of the cathode active material precursor for the secondary battery, the cooling and crystallizing tank may cool a temperature to 10° C.

In the preparing apparatus of the cathode active material precursor for the secondary battery, the initial solution preparation tank may heat the stored co-precipitation filtrate to 45° C. or higher.

The preparing apparatus of the cathode active material precursor for the secondary battery may further include an ammonium sulfate supply tank configured to store the ammonium sulfate in which in the co-precipitation reaction, a metal solution is prepared by dissolving a metal sulfate in distilled water, and the metal solution is injected into a reactor together with NaOH and $NH_4OH$; and instead of $NH_4OH$ in the co-precipitation reaction, the ammonium sulfate produced while removing the ammonia is redissolved and used.

According to the method for preparing the cathode active material precursor for the secondary battery, among components of a co-precipitation filtrate generated in a co-precipitation reaction for preparing a cathode active material precursor for a secondary battery, ammonia may be removed through a process of concentration with ammonium sulfate or ammonium nitrate, sodium sulfate may be precipitated through cooling crystallization, and the remaining co-precipitation filtrate may be recycled back to form a metal solution. Therefore, by-products such as ammonium sulfate, ammonium nitrate, and sodium sulfate may be additionally prepared through the co-precipitation reaction process, and a yield may be maximized.

In addition, according to another embodiment of the present invention, by implementing the preparing method of the present invention, it is possible to provide a cathode active material precursor preparing apparatus for a secondary battery including the process of recycling the co-precipitation filtrate generated in the co-precipitation reaction.

MODE FOR INVENTION

Hereinafter, the present invention will be described with reference to the accompanying drawings. As those skilled in the art would realize, the described embodiments may be modified in various different ways, all without departing from the spirit or scope of the present invention.

Hereinafter, embodiments of the present invention will be described in detail with reference to the accompanying drawings.

Figure 1:
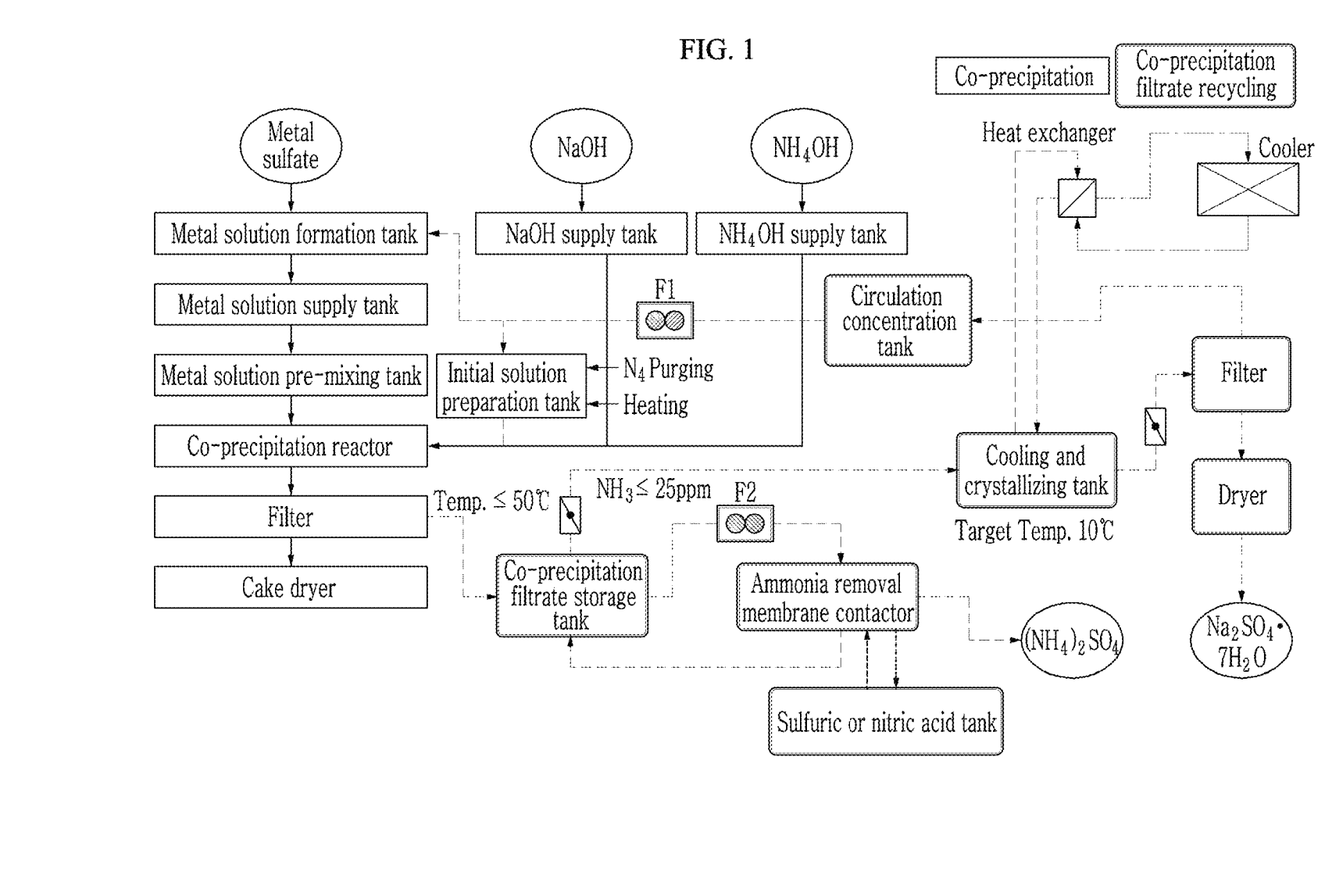
FIG. 1 illustrates a schematic view of a batch co-precipitation method including a co-precipitation filtrate recycling process according to an embodiment of the present invention.

FIG. 1 illustrates a schematic view of a batch co-precipitation method including a co-precipitation filtrate recycling process according to an embodiment of the present invention. Referring to FIG. 1, for a general co-precipitation reaction, a metal sulfate is dissolved in distilled water to prepare a metal solution in which $NiSO_4$, $CoSO_4$, $MnSO_4$, etc. are mixed, and injected into a reactor together with NaOH and $NH_4OH$ to perform the co-precipitation reaction. In a case of a conventional co-precipitation reaction, a precursor prepared after the co-precipitation reaction is filtered through a filter press in a filtration step, and then subjected to a water washing process and then a drying process. In this case, the remaining solution after filtration in the filter press and the washing solution used for washing the precursor filtered by the filter press remain as a co-precipitation filtrate, and the co-precipitation filtrate contains eluted metal ions (nickel, cobalt, and manganese), fine metal hydroxides (nickel hydroxide, cobalt hydroxide, and manganese hydroxide) of 5 μm or less, $Na^{2+}$, $SO_4^{2-}$, $NH_3$, and the like. In the embodiment of the present invention, the co-precipitation filtrate remaining after filtration in the filter press is stored in the co-precipitation filtrate storage tank, and in this case, in order to adjust a molar ratio of $Na^{2+}$ and $SO_4^{2-}$ of the co-precipitation filtrate, pH is increased to 11.8 or more by adding NaOH. The co-precipitation filtrate having the adjusted pH is passed through a filter (F2), and in this case, the filter (F2) serves to filter the fine metal hydroxide remaining in the co-precipitation filtrate and a newly formed metal hydroxide when adding NaOH in the co-precipitation filtrate storage tank. Filtration of the co-precipitation filtrate through the filter F2 serves to filter sodium hydroxide or metal ions so that they are not entered as impurities, when cooling sodium sulfate later. When the co-precipitation filtrate from which the metal hydroxide has been removed through the filter F2 is transferred to an ammonia removal membrane contactor to contact $NH_3$ in the gaseous state with dilute sulfuric acid or nitric acid, while the ammonia is removed, ammonium sulfate $((NH_4)_2SO)$ is produced as a by-product. The co-precipitation filtrate in which the ammonia was removed by passing through the ammonia removal membrane contactor is transferred to a cooling crystal tank. The co-precipitation filtrate transferred to the cooling crystal tank is cooled to 10° C. to precipitate sodium sulfate, and in this case, a heat exchanger and a cooler are used for cooling. After the sodium sulfate precipitated through the filter is separated from the co-precipitation filtrate, the precipitated sodium sulfate is dried in a dryer, and the precipitated sodium sulfate and the separated co-precipitation filtrate are transferred to an initial solution preparation tank and a metal solution formation tank through a circulation concentration tank to form a metal solution again. In the initial solution preparation tank, the co-precipitation filtrate was heated to 45° C., and in order to prevent oxidation of metal ions during the initial co-precipitation reaction, $N_2$ purging or $N_2$ bubbling is performed.

When using the co-precipitation filtrate recycling process according to the embodiment of the present invention, taking an NCM precursor of 83% nickel as an example, about 3.1 tons of sodium sulfate $(Na_2SO_4 \cdot 7H_2O)$ may be obtained from the co-precipitation filtrate generated when preparing 1 ton of precursor, and when ammonia is concentrated using a membrane and sulfuric acid, ammonium sulfate $((NH_4)_2SO_4)$ of about 1.3 tons may be obtained as a by-product. The metal ions eluted by ammonia, etc. remain at 1000 ppm or more in the co-precipitation filtrate depending on a pH condition, which corresponds to 0.1 to several percent of a total amount of metal ions added.

Figure 2:
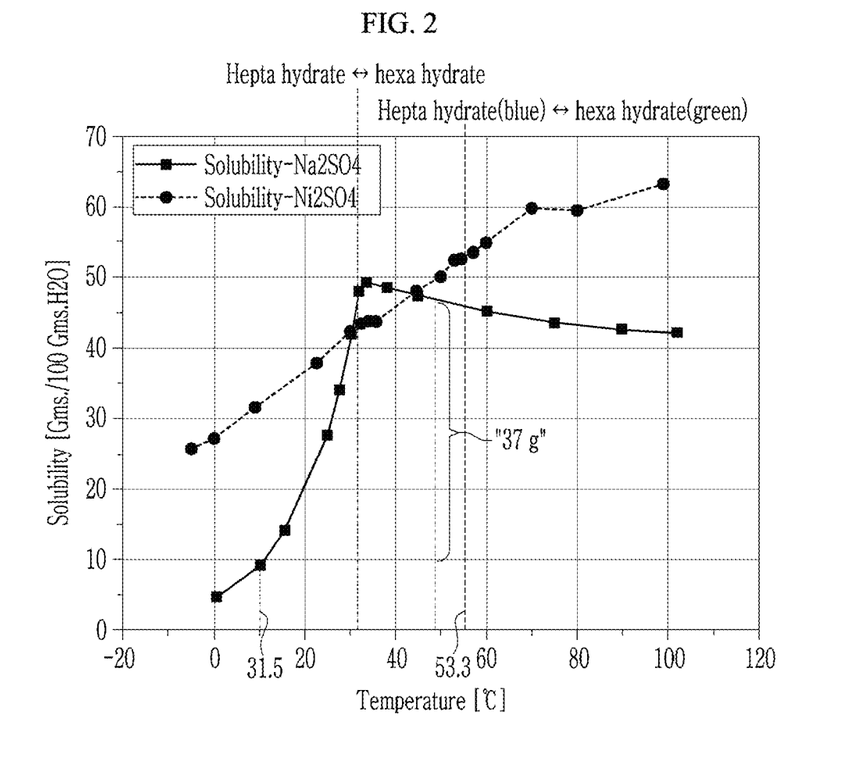
FIG. 2 illustrates a curve of a difference in solubility of a sodium sulfate and a nickel sulfate according to a temperature.

FIG. 2 illustrates a curve of a difference in solubility of sodium sulfate $(Na_2SO_4)$ and nickel sulfate $(NiSO_4)$ according to temperature, and the curve indicates that sodium sulfate may be precipitated when the co-precipitation filtrate from which ammonia has been removed is cooled to 10° C. in the co-precipitation filtrate recycling step according to the embodiment of the present invention.

Figure 3:
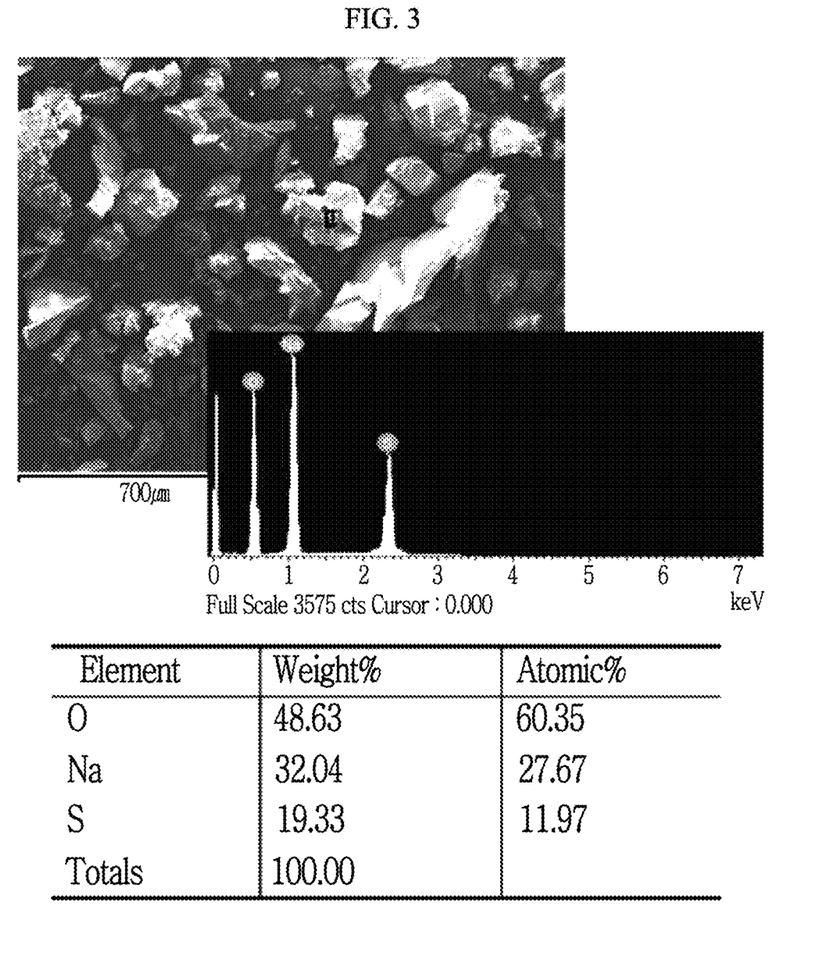
FIG. 3 illustrates a result of analyzing components of a sodium sulfate precipitated in a co-precipitation filtrate recycling process of a preparing method according to an embodiment of the present invention.

FIG. 3 shows results of analyzing components of the sodium sulfate precipitated by cooling the ammonia-removed co-precipitation filtrate to 10° C. in the process of recycling the co-precipitation filtrate of the preparing method according to the embodiment of the present invention, and referring to FIG. 3, since solubility of nickel sulfate at 10° C. is significantly higher than that of sodium sulfate as shown in FIG. 2, it can be seen that impurities such as nickel sulfate were not introduced into the precipitated sodium sulfate.

Figure 4:
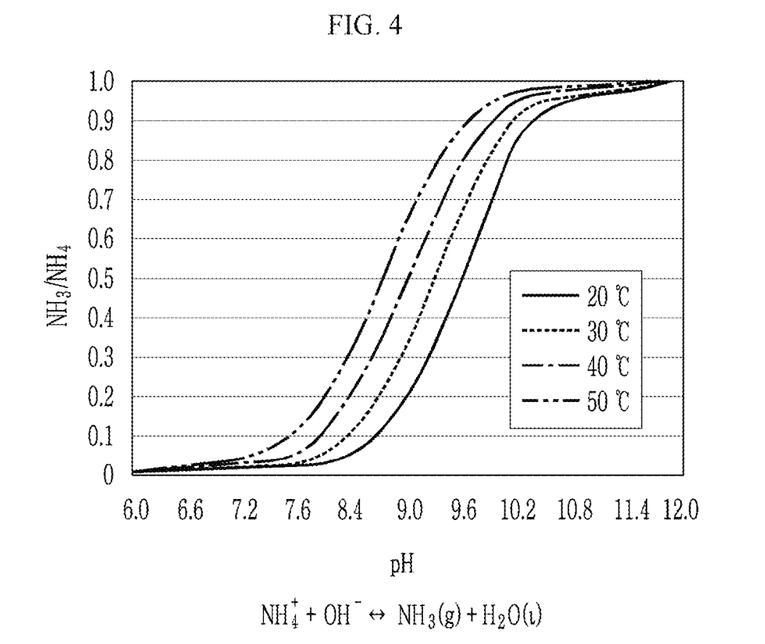
FIG. 4 illustrates a ratio of $NH_3/NH_4^+$ according to temperature and pH.
Figure 5:
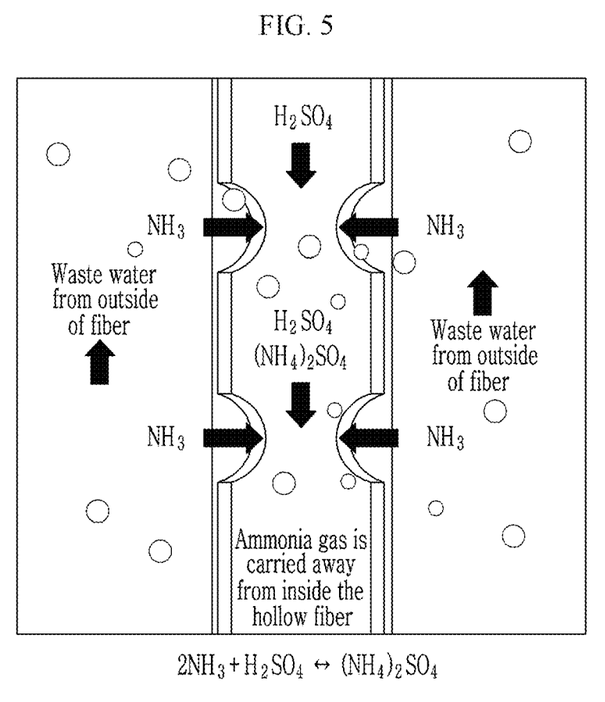
FIG. 5 illustrates a reaction in which gaseous ammonia passes through a membrane, reacts with sulfuric acid, and concentrates with sodium sulfate, in the membrane for removing ammonia according to an embodiment of the present invention.

Generally, a temperature of the co-precipitation filtrate after the co-precipitation reaction to prepare the NCM precursor is 45° C. or higher, and pH thereof is 11 or higher, and in this case, the ammonia is mostly present in an $NH_3$ gas state (see FIG. 4). In the embodiment of the present invention, since the co-precipitation filtrate contains 5000 ppm or more of ammonia, in order to remove the ammonia contained in the co-precipitation filtrate without affecting the co-precipitation reaction when recycling the co-precipitation filtrate, the ammonia present in the $NH_3$ gas state is reacted with sulfuric acid or nitric acid to be concentrated and removed with sodium sulfate or sodium nitrate. In this case, the $NH_3$ gas reacts with sulfuric acid or nitric acid while passing through the membrane in a gaseous state according to Henry's Law presented below.

Henry's Law (P=Hx)
P=partial pressure of gas in contact with solution
H=Henry's proportional constant of gas
x=concentration of gas dissolved in solution As shown in FIG. 4, it can be seen that the higher the pH, the higher the ammonia removal efficiency, and the higher the temperature of the co-precipitation filtrate, the higher the removal efficiency of ammonia. Therefore, in the embodiment of the present invention, during the co-precipitation reaction, when the temperature of the co-precipitation filtrate decreases while passing through a compression-type filtration process after the reaction is finished at 48° C. or higher, temperature compensation is performed through the heater of the co-precipitation filtrate. After the co-precipitation reaction, since the pH of the co-precipitation filtrate is higher than 11, when a small amount of NaOH is applied to match a molar ratio of $Na^{2+}$ and $SO^{4-}$, the pH is increased to 11.8 or higher, so that the ammonia removal efficiency may be maintained very high.

Figure 6:
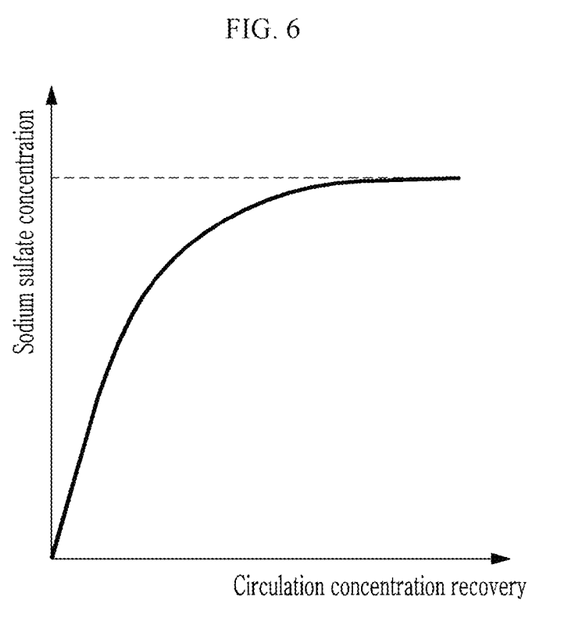
FIG. 6 is a curve illustrating that while a co-precipitation filtrate is circulated and used several times by using a co-precipitation method according to an embodiment of the present invention, a certain amount of sodium sulfate is precipitated when being circulated a predetermined number of times or more.

$Na^{2+}$, $SO^{4-}$, $Ni^{2+}$, etc. in an ion state are present in the co-precipitation filtrate from which ammonia has been removed. When the co-precipitation filtrate is cooled to 10° C., $Na^{2+}$ and $SO^{4-}$ are precipitated in a form of sodium sulfate ($Na_2SO_4 \cdot 7H_2O$) hydrate (see FIG. 2), and $Na^{2+}$ and $SO^{4-}$ below the solubility remain in the co-precipitate together with $Ni^{2+}$. The co-precipitation filtrate in which the ammonia is removed and the concentrations of $Na^{2+}$ and $SO^{4-}$ are decreased through the above steps forms a metal solution, or is fed to the initial solution preparation tank and recycled in the co-precipitation reaction. Referring to FIG. 6, when the preparing process according to the embodiment of the present invention is repeated several times, $Na^{2+}$ and $SO^{4-}$ are concentrated and eventually the co-precipitation filtrate is recycled a certain number of cycles or more, and after cooling crystallization, a certain amount of sodium sulfate is precipitated and the $Na^{2+}$ and $SO^{4-}$ ion concentrations of the circulated co-precipitation filtrate are kept constant, so that the process conditions are stabilized during the co-precipitation reaction.

Figure 7:
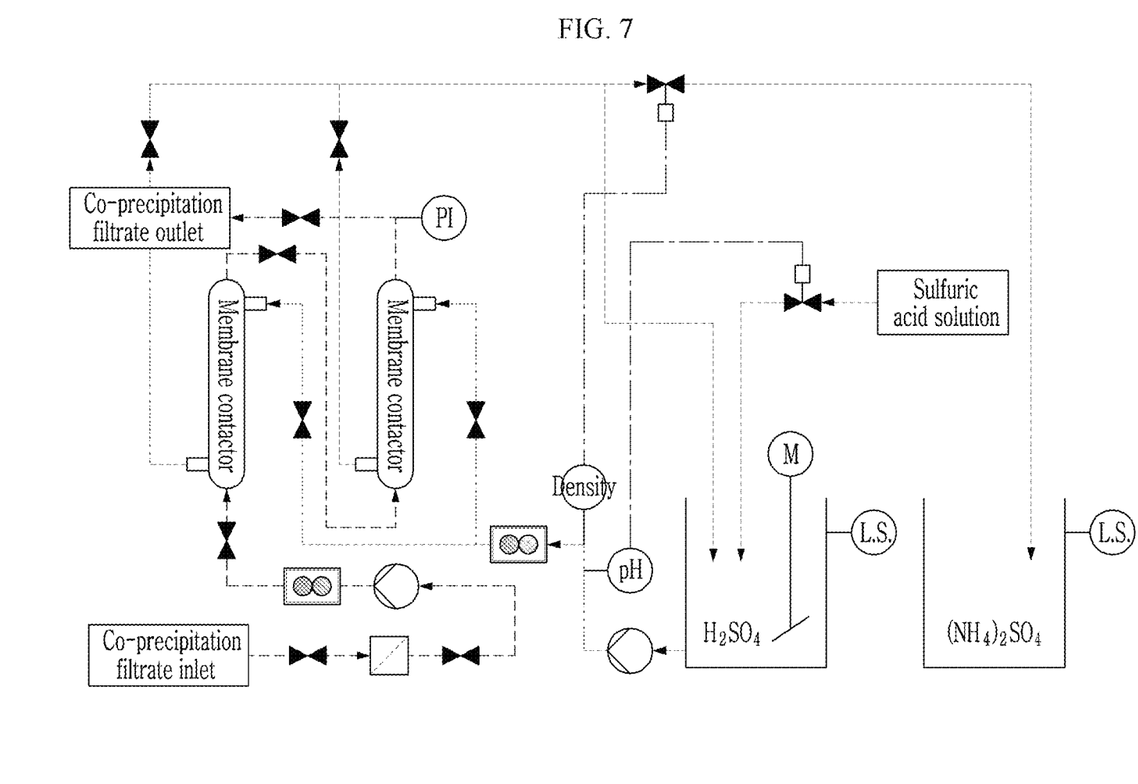
FIG. 7 illustrates a subdivided schematic diagram of a process in a membrane contactor for removing ammonia among co-precipitation methods according to an embodiment of the present invention.

FIG. 7 illustrates a subdivided schematic diagram of a process in a membrane contactor for removing ammonia among co-precipitation methods according to an embodiment of the present invention.

Referring to FIG. 7, when a dilute sulfuric acid is supplied to the membrane contactor, it reacts with ammonia gas to produce ammonium sulfate, and when diluted nitric acid is supplied thereto, it reacts with ammonia gas to produce ammonium nitrate. In this case, in the membrane contactor, only $NH_3$ gas is moved to react in a state in which the sulfuric acid or nitric acid is separated from the co-precipitation filtrate as described above. A density of ammonium sulfate concentrated in the sulfuric acid storage tank is measured, and when the ammonium sulfate is concentrated to a predetermined level or more, it is transferred to the ammonium sulfate storage tank. When most of the ammonia is removed through the process of removing the ammonia from the membrane contactor, the co-precipitation filtrate in the precipitation filtration tank is cooled to 10° C. using the heat exchanger and cooler, and during the cooling, $Na^{2+}$ and $SO^{4-}$ in the co-precipitation filtrate are precipitated in a form of sodium sulfate hydrate at an amount equal to or less than the saturated solubility. The precipitated sodium sulfate is separated from the co-precipitation filtrate through filtration, and the remaining co-precipitation filtrate is stored in the circulation concentration tank.

The stored co-precipitation filtrate is supplied to the initial solution preparation tank and the metal solution formation tank to be recirculated, and the concentration of $Na^{2+}$ and $SO^{4-}$ is concentrated when the co-precipitation filtrate recycling process is repeated several times or more.

Figure 8:
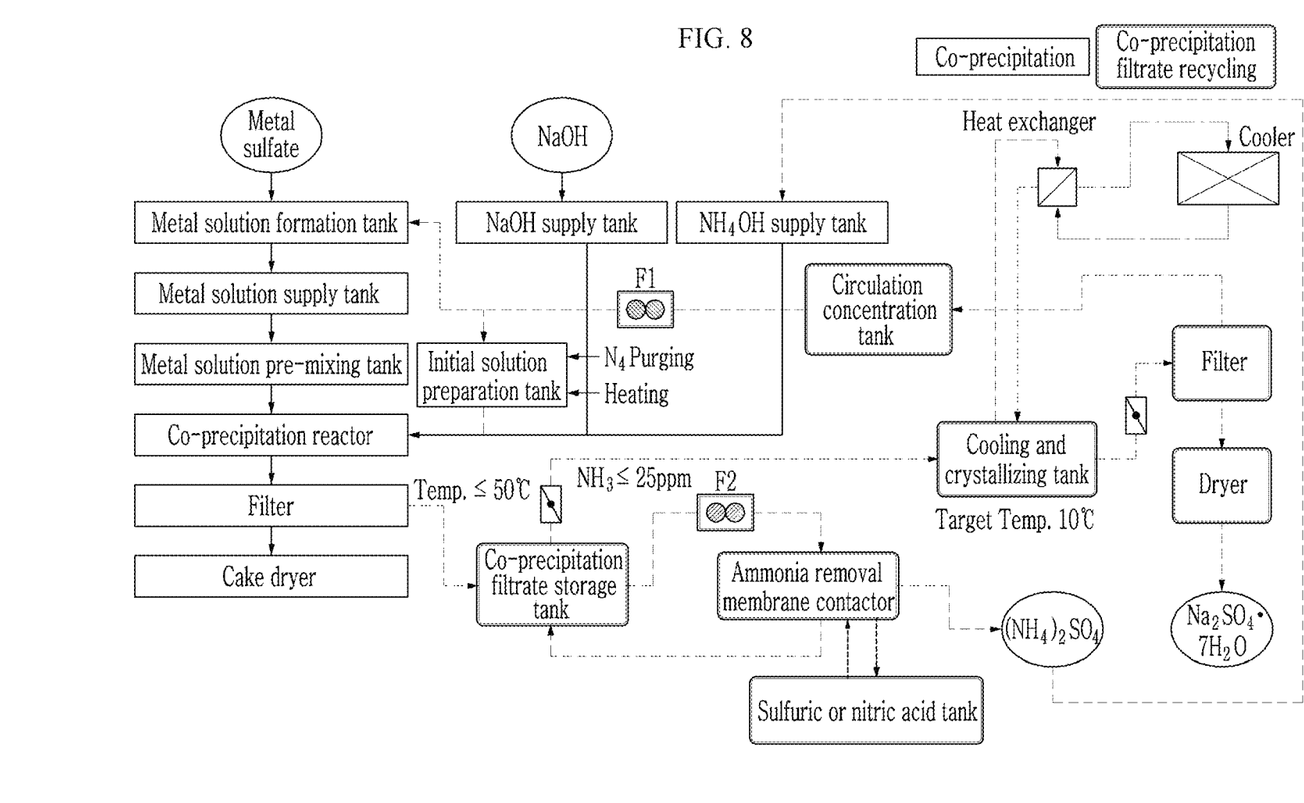
FIG. 8 illustrates a schematic view of a batch co-precipitation method including a co-precipitation filtrate recycling process according to another embodiment of the present invention, wherein in order to use ammonium sulfate concentrated through a membrane as a chelating catalyst, an ammonium sulfate feed tank for redissolving and supplying the ammonium sulfate is added.

Referring to FIG. 8, in the batch co-precipitation method including the co-precipitation filtrate recycling process according to the embodiment of the present invention shown in FIG. 1, it can be seen that the ammonium sulfate produced and concentrated through the membrane may be re-dissolved to be used as a chelate catalyst, and a step of adding it instead of ammonia during the co-precipitation reaction may be added.

Figure 9:
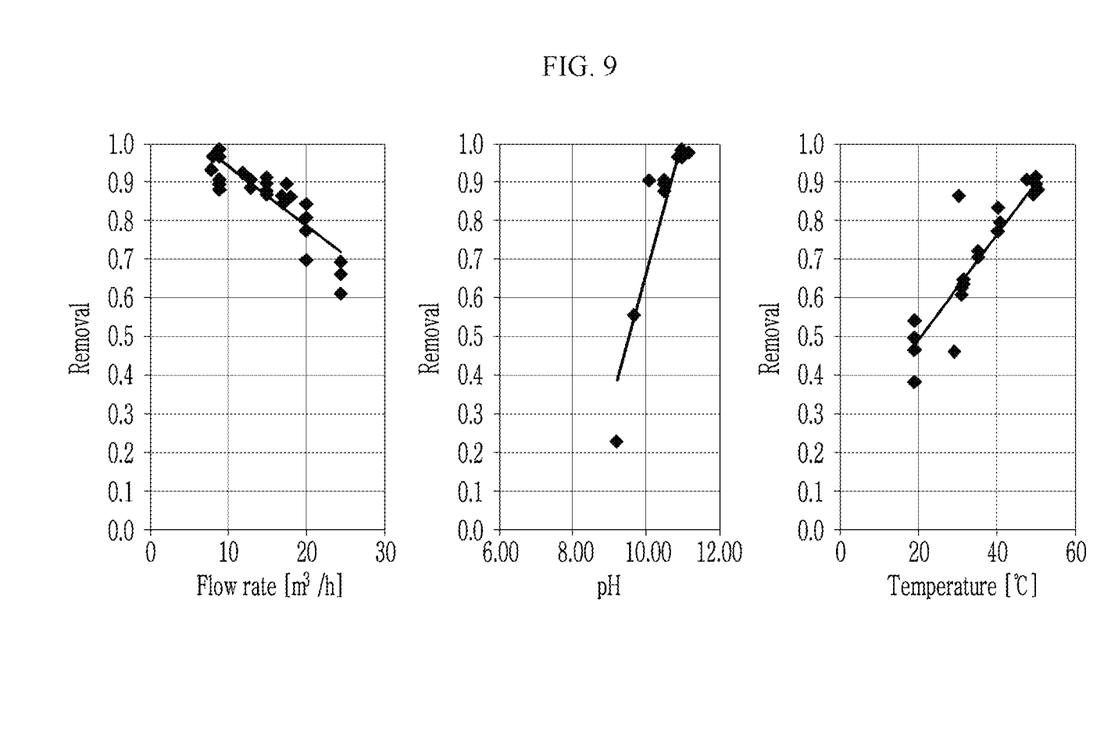
FIG. 9 illustrates a graph of an ammonia removal rate according to flow rate, pH, and temperature of a co-precipitation filtrate in a membrane for removing ammonia according to an embodiment of the present invention.

FIG. 9 illustrates a graph of an ammonia removal rate according to flow rate, pH, and temperature of a co-precipitation filtrate in a membrane for removing ammonia according to an embodiment of the present invention, and according to the graph, it can be seen that the ammonia removal efficiency increases as the temperature and pH of the co-precipitation filtrate increase.

Figure 10:
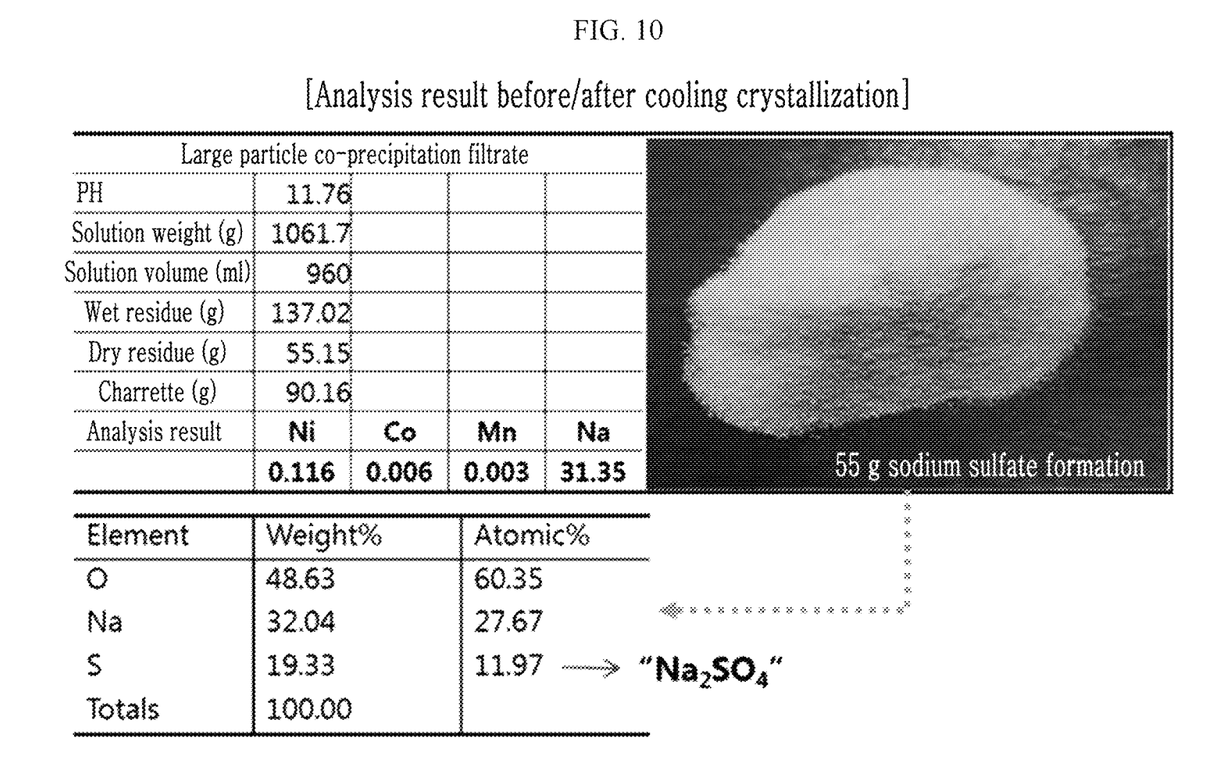
FIG. 10 illustrates a comparison of components included in a co-precipitation filtrate before a cooling crystallization process and components of sodium sulfate precipitated after cooling crystallization according to an embodiment of the present invention.

FIG. 10 illustrates a comparison of components included in a co-precipitation filtrate before a cooling crystallization process and components of sodium sulfate precipitated after cooling crystallization according to an embodiment of the present invention, wherein it can be seen that metal ions such as nickel, cobalt, and manganese contained in the co-precipitation filtrate are almost not included in the precipitated sodium sulfate.

Figure 11:
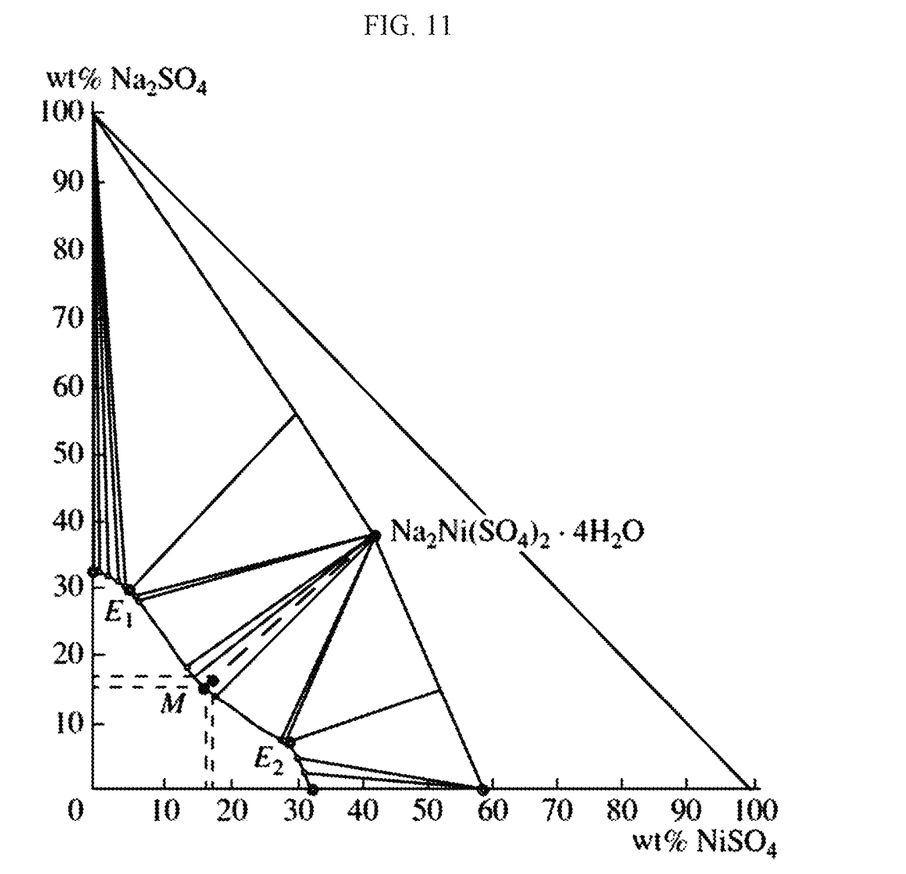
FIG. 11 is a $Na_2Ni(SO_4)_2 \cdot 4H_2O$ isothermal solubility graph showing conditions under which a $Na_2Ni(SO_4)_2 \cdot 4H_2O$ compound may be prepared in a $Na_2SO_4$—$NiSO_4$—$H_2O$ system in an isothermal state of 50° C.

FIG. 11 is a $Na_2Ni(SO_4)_2 \cdot 4H_2O$ isothermal solubility graph showing conditions under which a $Na_2Ni(SO_4)_2 \cdot 4H_2O$ compound may be prepared in a $Na_2SO_4$—$NiSO_4$—$H_2O$ system in an isothermal state of 50° C., and it shows that the possibility of formation of sodium sulfate and nickel sulfate compounds in the co-precipitation filtrate recycling process according to the embodiment of the present invention is very low. Referring to FIG. 11, it shows that at 50° C. or higher as an initial condition, $Na_2Ni(SO_4)_2 \cdot 4H_2O$ that is a compound of $Na_2SO_4$ and $NiSO_4$ is produced at an M point at which $Na_2SO_4$ is 17.78 wt %, $NiSO_4$ is 18.24 wt %, and $H_2O$ is 63.98 wt %, wherein, as shown in FIG. 10, the concentration of nickel sulfate contained in the co-precipitation filtrate according to the embodiment of the present invention is very low, so there is almost no compound form of $Na_2SO_4$ and $NiSO_4$ formed at the point M of FIG. 11.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for preparing a cathode active material precursor for a secondary battery, the method comprising:
    moving a co-precipitation filtrate generated after a co-precipitation reaction to a co-precipitation filtrate storage tank;
    removing a metal hydroxide by passing the co-precipitation filtrate through a filter;
    reacting the co-precipitation filtrate from which the metal hydroxide is removed with sulfuric acid or nitric acid to produce an ammonium sulfate or an ammonium nitrate while removing ammonia from the co-precipitation filtrate from which the metal hydroxide is removed;
    cooling and crystallizing the co-precipitation filtrate from which the metal hydroxide and ammonia are removed to precipitate a sodium sulfate;
    filtering the precipitated sodium sulfate to separate the precipitated sodium sulfate from the co-precipitation filtrate from which the metal hydroxide and ammonia are removed;
    drying the sodium sulfate separated from the co-precipitation filtrate and moving the co-precipitation filtrate separated from the sodium sulfate to a circulation concentration tank; and
    heating the co-precipitation filtrate stored in the circulation concentration tank to a predetermined temperature for recycling and performing $N_2$ purging or bubbling.

2. The method for preparing of claim 1, further comprising
increasing pH of the co-precipitation filtrate to 11.8 or more by adding NaOH to the co-precipitation filtrate in the co-precipitation filtrate storage tank.

3. The method for preparing of claim 1, wherein
in the removing of the metal hydroxide by passing the co-precipitation filtrate through the filter, the metal hydroxide includes a metal hydroxide remaining in the co-precipitation filtrate and a metal hydroxide newly formed when NaOH is added to the co-precipitation filtrate.

4. The method for preparing of claim 1, wherein
in the reacting of the co-precipitation filtrate from which the metal hydroxide is removed with the sulfuric acid or nitric acid to produce the ammonium sulfate or ammonium nitrate while removing ammonia from the co-precipitation filtrate from which the metal hydroxide is removed, the ammonia is $NH_3$ in a gaseous state.

5. The method for preparing of claim 1, wherein
in the cooling and crystallizing the co-precipitation filtrate from which the metal hydroxide and ammonia are removed to precipitate the sodium sulfate, the co-precipitation filtrate is cooled to 10° C.

6. The method for preparing of claim 1, wherein
in the heating of the co-precipitation filtrate stored in the circulation concentration tank to the predetermined temperature for recycling, the temperature is 45° C. or higher.

7. The method for preparing of claim 1, wherein
in the co-precipitation reaction, a metal solution is prepared by dissolving a metal sulfate in distilled water, and the metal solution is injected into a reactor together with NaOH and $NH_4OH$; and
instead of $NH_4OH$ in the co-precipitation reaction, the ammonium sulfate produced while removing the ammonia is re-dissolved and used.

8. A preparing apparatus of a cathode active material precursor for a secondary battery, the preparing apparatus comprising:
a co-precipitation filtrate storage tank configured to store a co-precipitation filtrate generated after a co-precipitation reaction;
a filter configured to remove a metal hydroxide from the co-precipitation filtrate;
an ammonia removal membrane contactor configured to remove ammonia from the co-precipitation filtrate from which the metal hydroxide is removed;
a sulfuric acid or nitric acid tank configured to supply sulfuric acid or nitric acid to be in contact with ammonia to the ammonia removal membrane contactor;
a cooling and crystallizing tank configured to cool and crystallize the co-precipitation filtrate from which the metal hydroxide and ammonia are removed to precipitate sodium sulfate;
a filter configured to filter the precipitated sodium sulfate to separate the precipitated sodium sulfate from the co-precipitation filtrate from which the metal hydroxide and ammonia are removed;
a dryer configured to dry the sodium sulfate separated from the co-precipitation filtrate;
a circulation concentration tank configured to store the co-precipitation filtrate separated from the sodium sulfate; and
an initial solution preparation tank configured to heat the co-precipitation filtrate stored in the circulation concentration tank to a predetermined temperature for recycling and to perform $N_2$ purging or bubbling.

9. The preparing apparatus of claim 8, wherein
pH of the co-precipitation filtrate is increased to 11.8 or more by adding NaOH to the co-precipitation filtrate in the co-precipitation filtrate storage tank.

10. The preparing apparatus of claim 8, wherein
the filter removes a metal hydroxide remaining in the co-precipitation filtrate and a metal hydroxide newly formed when NaOH is added to the co-precipitation filtrate.

11. The preparing apparatus of claim 8, wherein
ammonia exists as $NH_3$ in a gaseous state in the ammonia removal membrane contactor.

12. The preparing apparatus of claim 8, wherein
the cooling and crystallizing tank cools a temperature to 10° C.

13. The preparing apparatus of claim 8, wherein
the initial solution preparation tank heats the stored co-precipitation filtrate to 45° C. or higher.

14. The preparing apparatus of claim 8, further comprising:
an ammonium sulfate supply tank configured to store the ammonium sulfate in which in the co-precipitation reaction, a metal solution is prepared by dissolving a metal sulfate with distilled water, and the metal solution is injected into a reactor together with NaOH and $NH_4OH$; and
instead of $NH_4OH$ in the co-precipitation reaction, the ammonium sulfate produced while removing the ammonia is re-dissolved and used.

* * * * *